(12) United States Patent
Foussard et al.

(10) Patent No.: US 8,848,853 B2
(45) Date of Patent: Sep. 30, 2014

(54) STORAGE RACK FOR FRESH OR SPENT NUCLEAR FUEL ASSEMBLIES

(75) Inventors: Guillaume Foussard, Le Mesnil Saint Denis (FR); Régis Andre, Paris (FR)

(73) Assignee: TN International, Montigny le Bretonneux (FR)

( * ) Notice: Subject to any disclaimer, the term of this patent is extended or adjusted under 35 U.S.C. 154(b) by 781 days.

(21) Appl. No.: 13/001,368

(22) PCT Filed: Jul. 3, 2009

(86) PCT No.: PCT/EP2009/058436
§ 371 (c)(1),
(2), (4) Date: Feb. 25, 2011

(87) PCT Pub. No.: WO2010/000846
PCT Pub. Date: Jan. 7, 2010

(65) Prior Publication Data
US 2011/0142189 A1    Jun. 16, 2011

(30) Foreign Application Priority Data
Jul. 4, 2008    (FR) .................................... 08 54576

(51) Int. Cl.
*G21C 19/07*    (2006.01)
*G21C 19/40*    (2006.01)

(52) U.S. Cl.
CPC ........... *G21C 19/07* (2013.01); *G21Y 2002/207* (2013.01); *G21Y 2004/30* (2013.01); *G21Y 2002/50* (2013.01); *G21C 19/40* (2013.01); *G21Y 2002/303* (2013.01)
USPC ....................................................... 376/272

(58) Field of Classification Search
USPC ......... 376/272; 211/60.1, 62, 70.2, 70.6, 70.8
See application file for complete search history.

(56) References Cited

U.S. PATENT DOCUMENTS

| 4,331,244 | A |   | 5/1982  | Davis, Jr.       |         |
|-----------|---|---|---------|------------------|---------|
| 4,711,758 | A | * | 12/1987 | Machado et al.   | 376/272 |
| 4,746,487 | A | * | 5/1988  | Wachter          | 376/272 |
| 4,781,883 | A | * | 11/1988 | Daugherty et al. | 376/272 |
| 4,800,283 | A | * | 1/1989  | Efferding        | 250/507.1 |

(Continued)

FOREIGN PATENT DOCUMENTS

| DE | 77 27 751 U1 | 12/1977 |   |
|----|--------------|---------|---|
| EP | 107889 A1 *  | 5/1984  | G21C 19/06 |

(Continued)

OTHER PUBLICATIONS

International Search Report, PCT/EP2009/058436, dated Oct. 1, 2009.

*Primary Examiner* — Bret Hayes
(74) *Attorney, Agent, or Firm* — Nixon Peabody LLP

(57) ABSTRACT

A storage rack for nuclear fuel assemblies, comprising a rigid structure defining a plurality of adjacent cells, and comprising in each cell a sleeve defining a cavity intended to receive a nuclear fuel assembly, the sleeve having, in cross-sectional orthogonal to the longitudinal direction, a generally polygonal shape whereof the sides are produced using plates made from a neutron-absorbing material. According to the invention, the sleeve also includes: profiles each forming a corner piece, arranged on at least several angles of the generally polygonal cross-section, these profiles serving as a mounting bracket for the plates made of a neutron-absorbing material; and a structure for maintaining the profiles therebetween.

10 Claims, 7 Drawing Sheets

(56) References Cited

U.S. PATENT DOCUMENTS

| | | | |
|---|---|---|---|
| 4,948,553 A * | 8/1990 | Machado et al. | 376/272 |
| 4,997,618 A * | 3/1991 | Efferding | 376/272 |
| 5,384,813 A * | 1/1995 | Loftis et al. | 376/272 |
| 5,550,882 A * | 8/1996 | Lehnert et al. | 376/272 |
| 6,118,838 A * | 9/2000 | Robert et al. | 376/272 |
| 6,442,227 B1 * | 8/2002 | Iacovino et al. | 376/272 |
| 2004/0156466 A1 * | 8/2004 | Lindquist | 376/272 |

FOREIGN PATENT DOCUMENTS

| | | | | |
|---|---|---|---|---|
| EP | 0 175 140 A1 | | 3/1986 | |
| FR | 2 759 484 A1 | | 8/1998 | |
| JP | 02129598 A | * | 5/1990 | G21C 19/40 |
| JP | 05 040195 A | | 2/1993 | |
| WO | 99/07001 A | | 2/1999 | |

\* cited by examiner

STORAGE RACK FOR FRESH OR SPENT NUCLEAR FUEL ASSEMBLIES

CROSS REFERENCE TO RELATED APPLICATIONS OR PRIORITY CLAIM

This application is a National Phase of PCT/EP2009/058436, filed Jul. 3, 2009, entitled, "STORAGE RACK FOR FRESH OR SPENT NUCLEAR FUEL ASSEMBLIES", and claims priority of French Patent Application No. 08 54576, filed Jul. 4, 2008.

TECHNICAL FIELD

The present invention generally concerns the field of storage racks for fresh nuclear fuel assemblies or nuclear fuel assemblies previously spent in a nuclear reactor.

The invention is applicable to the storage of all types of nuclear fuel assemblies, in particular those intended for pressurized water reactors (PWR).

BACKGROUND OF THE INVENTION

When nuclear fuel assemblies must be stored, they are generally placed in storage racks, submerged in pools. These racks usually have a rigid structure or "skeleton" defining a plurality of cavities or "cells," parallel to each other and oriented vertically when the rack is submerged in the pool. At least some of these cells receive a sleeve defining a cavity for receiving a nuclear fuel assembly. In order to reduce the distances between each cell as much as possible and thereby increase the storage capacity of the rack, while ensuring the sub-criticality of the latter part when it is loaded with nuclear fuel assemblies, this sleeve has a neutron absorption power, as described in document FR 2 759 484. To do this, plates made from a so-called "neutron absorbing" material, such as borated stainless steel, are used. Moreover, a water blade is present between the cell of the rigid structure and its associated sleeve, making it possible, together with the neutron absorbing material, to avoid any risk of criticality.

Traditionally, the cell, the sleeve and the nuclear fuel assembly have, in section, a same general shape, usually square, but more generally polygonal.

In document FR 2 759 484, the design of the sleeves is relatively simple, but can be problematic, given that the fuel assembly is in direct contact with the plates made from a neutron absorbing material. This situation results in a significant risk of rifling damage of the neutron-absorbing plates during operations for loading and unloading assemblies in the cavity.

Furthermore, the edge of the neutron-absorbing plates must be serrated so as to ensure their maintenance in position. In relation to plates with straight edges, these serrations require additional manufacturing and checking operations that do not make it possible to fully meet economic criteria.

In document EP 0 175 140 A1, sleeves are also inserted in cells. Nevertheless, the concept presented in that document has the drawback of using a neutron-absorbing material requiring its confinement between sheets, substantially complicating the production of the sleeves.

In document JP 05 040195 A (Toshiba Engineering Co), the sleeves are formed by openwork tubes, the neutron-absorbing plates being positioned in the openwork portions. The thickness of the walls forming the tubes must then be at least equal to that of the neutron-absorbing plates, which does not make it possible to optimize their thickness and therefore to comply with mass criteria. Furthermore, the tubes are made using costly machining operations so as to be able to receive the neutron-absorbing plates in the openwork portions. Lastly, the neutron-absorbing plates undergo discontinuities over a length at least equal to several times their thickness at elements keeping the profiles of the tube in position, which is detrimental to the performance of the sleeves from a criticality perspective by facilitating the neutron interaction between adjacent fuel assemblies.

BRIEF DESCRIPTION OF THE INVENTION

The invention therefore aims to at least partially resolve the aforementioned drawbacks, relative to the embodiments of the prior art. More specifically, the invention aims to provide a storage rack for nuclear fuel assemblies simultaneously offering high mechanical strength, a small overall mass, as well as a design ensuring easy production and assembly.

To do this, the invention relates to a storage rack for nuclear fuel assemblies, comprising a rigid structure defining a plurality of adjacent cells extending parallel to a longitudinal direction of the rack, said rack also including, in at least some of said cells and preferably in each cell, a sleeve defining a cavity extending parallel to said longitudinal direction, and intended to receive a nuclear fuel assembly, said sleeve having, in a cross-section orthogonal to said longitudinal direction, a polygonal general shape whereof at least some of the sides, and preferably all of them, are provided by means of plates made of neutron-absorbing material. According to the invention, said sleeve also includes:

profiles each forming a corner piece, spaced apart from each other and extending parallel to said longitudinal direction and arranged on at least several angles of said generally polygonal section, said profiles serving as a mounting bracket for said neutron-absorbing plates and having an inner surface defining said cavity making it possible to guide a nuclear fuel assembly when it is loaded in said cavity, as well as an outer surface opposite said inner surface and on which said neutron-absorbing plates bear; and a means for maintaining said profiles therebetween, said maintenance means ensuring centering of the sleeve in the cell of the rack and comprising a plurality of maintenance structures surrounding said profiles and spaced apart from each other in the longitudinal direction.

Thus, the proposed solution, in particular due to the presence of profiles each forming a corner, advantageously makes it possible to obtain a low overall mass, a design ensuring easy production and assembly, and high mechanical strength, all at once. Moreover, the inner surface of the profiles therefore makes it possible to guide the nuclear fuel assembly when it is loaded in the cavity and when it is unloaded, and, above all, prevents contact between the assembly and the neutron-absorbing plates, during such operations. Thus, aside from the fact that the guiding is done carefully preferably with only the profiles spaced apart from each other, the risk of damage by rifling of the plates during loading and unloading of the assembly is advantageously brought to naught while also satisfying the mass criteria concerning the sleeves. Moreover, with the maintenance structures surrounding the profiles, this enables extremely precise positioning of the profiles relative to each other, thereby ensuring a perfectly controlled geometry of the cavity. The connection between these elements is preferably ensured by welding, although other techniques can be contemplated without going beyond the scope of the invention.

Preferably, each maintenance structure has a general shape substantially identical to said general polygonal shape.

Preferably, each section assumes, in cross-section orthogonal to the longitudinal direction, an L or V shape. Preferably, each profile extends over substantially the entire length of the sleeve, which preferably extends over substantially the entire length of the cell of the rack in which it is located. For information, it is noted that each sleeve, once produced, assumes the form of a single-piece assembly capable of being placed in the cell.

Still out of a concern for increasing the overall rigidity of the sleeve, each profile is preferably metal, preferably made from stainless steel.

Preferably, each plate is made from a metallic-matrix composite (MMC) material comprising boron, preferably in the form of boron carbide, but can obviously be made from any other neutron-absorbing material, such as borated aluminum or borated stainless steel.

Preferably, each plate is mounted on two directly consecutive profiles, using maintenance tabs provided on the profiles. These tabs can be fixedly attached on the profiles, for example by welding, or be obtained by piercing said profiles. Thus, during assembly, the plates can be assembled by sliding between the outer surfaces of said profiles and said tabs, the sliding preferably being done in the longitudinal direction. Generally, the tabs not only enable pressing of the plates against the profiles, play between the profiles and the plates nevertheless being possible, but also form translational stops, in the direction of the width of the plates.

According to one preferred embodiment, each face of said sleeve has a plurality of neutron-absorbing plates, adjacent along the longitudinal direction. Thus, this configuration is said to be cut, in the sense that several plates arranged in the continuity of each other participate in the formation of a same face of the sleeve. This procures ease of production, handling and assembly of the plates, and makes it possible to obtain complete flatness. Moreover, the cut configuration makes it possible to place plates only in locations of the sleeve where neutron absorption is necessary, and not necessarily continuously over the entire length of the sleeve. Nevertheless, a solution in which each face of the sleeve only has a single and same neutron-absorbing plate can be contemplated, without going beyond the scope of the invention, as will be explained in detail below.

In the case of a cut configuration, preferably each plate extends between two maintenance structures that are directly consecutive in the longitudinal direction, these structures forming a stop for said plate in that same direction, preferably in both directions. In this case, each plate then has a length substantially equal to the distance separating the two maintenance structures between which it is situated, so as to be able to be kept abutting as mentioned above.

Alternatively, each plate can have a smaller length, not involving any stop against the maintenance structures arranged away from the plate.

Whatever the case may be, in this cut configuration, the maintenance structures surround the profiles by contacting their outer surfaces, without surrounding the plates they separate along the longitudinal direction.

According to a still more preferred embodiment, said maintenance structures are fixed bearing on the outer surface of said profiles, and at least one of said plates extends on either side of at least one of said maintenance structures in the longitudinal direction, passing in a recess formed in said structure. As a result, each concerned plate is housed between the outer face of the corners on which it is pressed, and the recess formed in the maintenance structure. Moreover, the plate can be made to travel through the recess of several consecutive maintenance structures in the longitudinal direction. In this respect, it is noted that a single plate is preferably provided for each face of the sleeve, extending over all or part of the length of the profiles in the longitudinal direction.

This embodiment has notable advantages in terms of production, in particular in that it only requires the sliding of a single plate per face, between the profiles and the maintenance structures thereof.

Moreover, this configuration allows natural circulation of the water over the height of the rack, for better cooling. Indeed, the water can easily pass through the play provided between the plates and the recesses formed in the maintenance structures of the profiles. It also makes it possible to avoid the presence of air bubbles that would remain stuck in the rack structure after the pool is filled with water, which must naturally be avoided so as to be certain that the rack is indeed in a controlled configuration from a criticality perspective.

Preferably, the width of each plate is strictly smaller than the width of the face of the sleeve it partially forms. This specificity comes from the observation that the neutron-absorbing material positioned in the angles of the sleeve only has a limited effectiveness in light of the low neutron interaction between two assemblies positioned along the diagonal of the cells of the rack. The neutron-absorbing material being particularly costly, such a solution providing for a plate width strictly smaller than the width of the face of the sleeve consequently helps meet economic criteria on one hand, and the mass criterion on the other, while also ensuring maintenance of the sub-criticality of the rack when it is loaded with nuclear fuel assemblies. Nevertheless, here again, a solution where the plates have a width identical to that of the face of the sleeve can be contemplated.

As mentioned above, said means for maintaining said profiles relative to each other bears on the side surface defining said cell of the rack in which said associated sleeve is located.

Preferably, each maintenance structure is arranged in a plane substantially orthogonal to the longitudinal direction.

These structures thus ensure very good centering of the sleeve in the cell of the rack, making it possible to form a water blade all around the sleeve, between the latter part and the side surface defining the cell of the rack cavity the sleeve, this blade making it possible, combined with the neutron-absorbing material, to prevent any risk of criticality.

Lastly, it is noted that said general polygonal shape is preferably a general square shape or a general hexagonal shape.

Other advantages and features of the invention will appear in the non-limiting detailed description below.

BRIEF DESCRIPTION OF THE DRAWINGS

This description will be done in light of the appended drawings, in which.

DETAILED DESCRIPTION OF PREFERRED EMBODIMENTS

Figure 1:
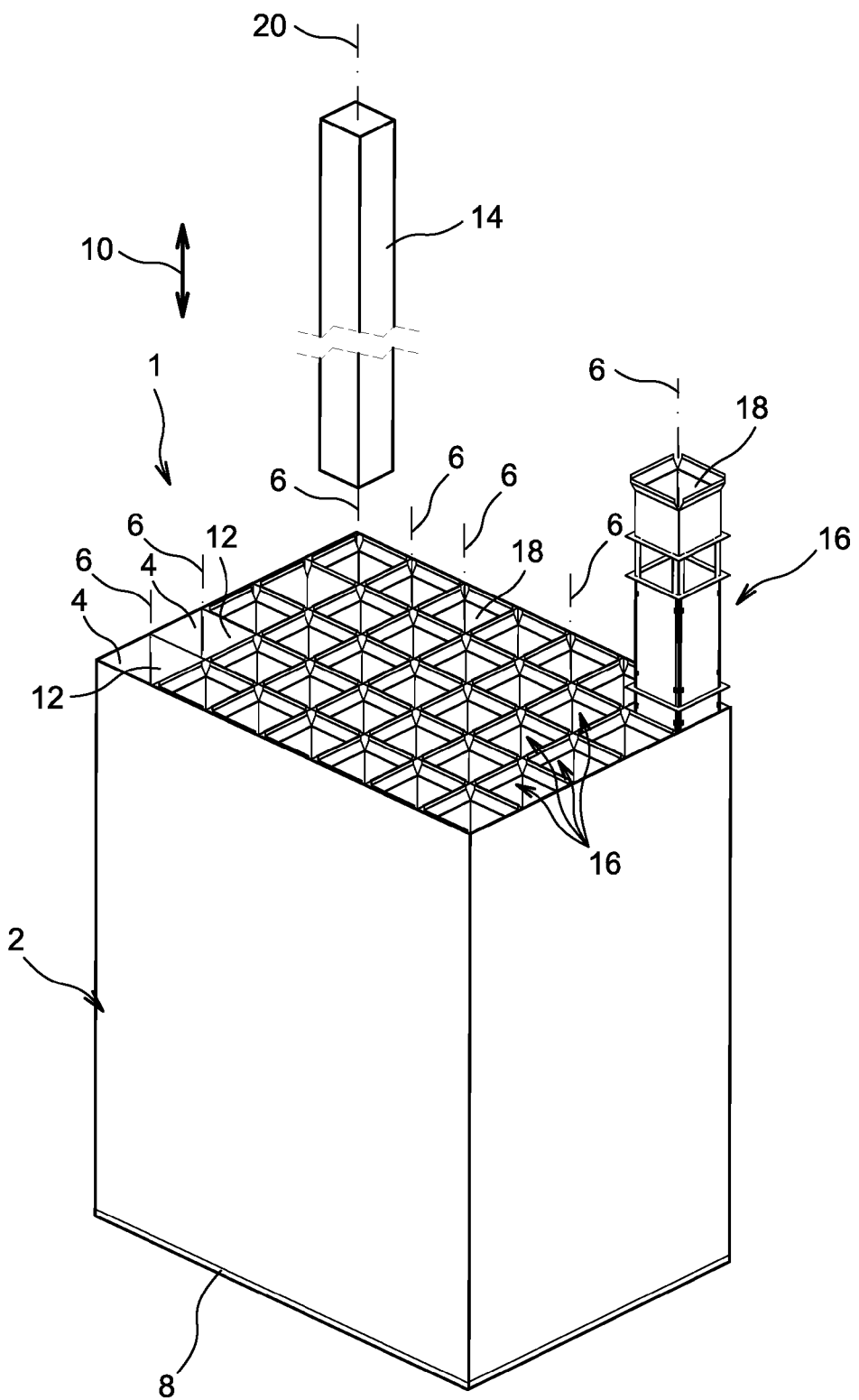
FIG. 1 shows a partially exploded perspective view of a storage rack according to one preferred embodiment of the invention.

First in reference to FIG. 1, a storage rack 1 for fresh nuclear fuel assemblies or nuclear fuel assemblies previously spent in a nuclear reactor is shown, the rack being intended to be submerged in a pool.

This figure shows that the rack 1 first has a rigid structure or "skeleton" 2, defining a plurality of cavities or "cells" 4 parallel to each other, and axes 6 oriented vertically when the rack 1 is submerged in the pool, with the bottom 8 of the structure 2 resting on the bottom of the pool. In this position shown in the figure, the axes 6, parallel to the longitudinal direction 10 of the rack, are therefore arranged vertically.

The cells 4, usually provided in large number, such as several dozen, can be obtained in any way known by those skilled in the art, such as that aiming to provide main sheets parallel to each other, separated by crosspiece sheets arranged orthogonally relative thereto. This leads to substantially cylindrical cells 4, each delimited by a side surface 12 having, in transverse cross-section, i.e. in cross-section orthogonal to the longitudinal direction 10, a general square shape corresponding to a preferred embodiment of the invention. Nevertheless, it is noted that other polygonal shapes are of course possible.

Generally, it is provided that this rigid structure 2, the cells 4 of which are open in the upper portion for loading and unloading of nuclear fuel assemblies 14 as diagrammatically illustrated in FIG. 1 for one of the cells, is made of stainless steel.

The fuel assemblies 14 are nevertheless not directly introduced into their associated cells 4. Indeed, for each cell 4 intended to receive an assembly 14, a neutron-absorbing assembly is also arranged in said cell, said assembly assuming the form of a sleeve 16, one of which has been intentionally partially extracted from its cell in FIG. 1. Each sleeve 16 therefore has a cavity 18 intended to receive a nuclear fuel assembly 14, said substantially cylindrical cavity 18 preferably having, in transverse cross-section, a square shape. Moreover, the axis of said cavity 18 is combined with the axis 6 of its associated cell, said axis 6 also being intended to be combined with the axis 20 of the assembly when the latter is placed in its cavity 18.

Preferably, each cell 4 is provided with a neutron-absorbing sleeve 16, although this could be different without going beyond the scope of the invention. Moreover, it is indicated that the lengths, along the direction 10, of a cell 4, its associated sleeve 16 and the cavity 18 of that sleeve, are preferably substantially identical, i.e. of the order of magnitude of the length of the nuclear fuel assembly 14 intended to be stored.

Referring now to FIGS. 2 to 5, the design of one of the sleeves 16 will be described, with the understanding that they all have identical or similar designs.

Figure 2:
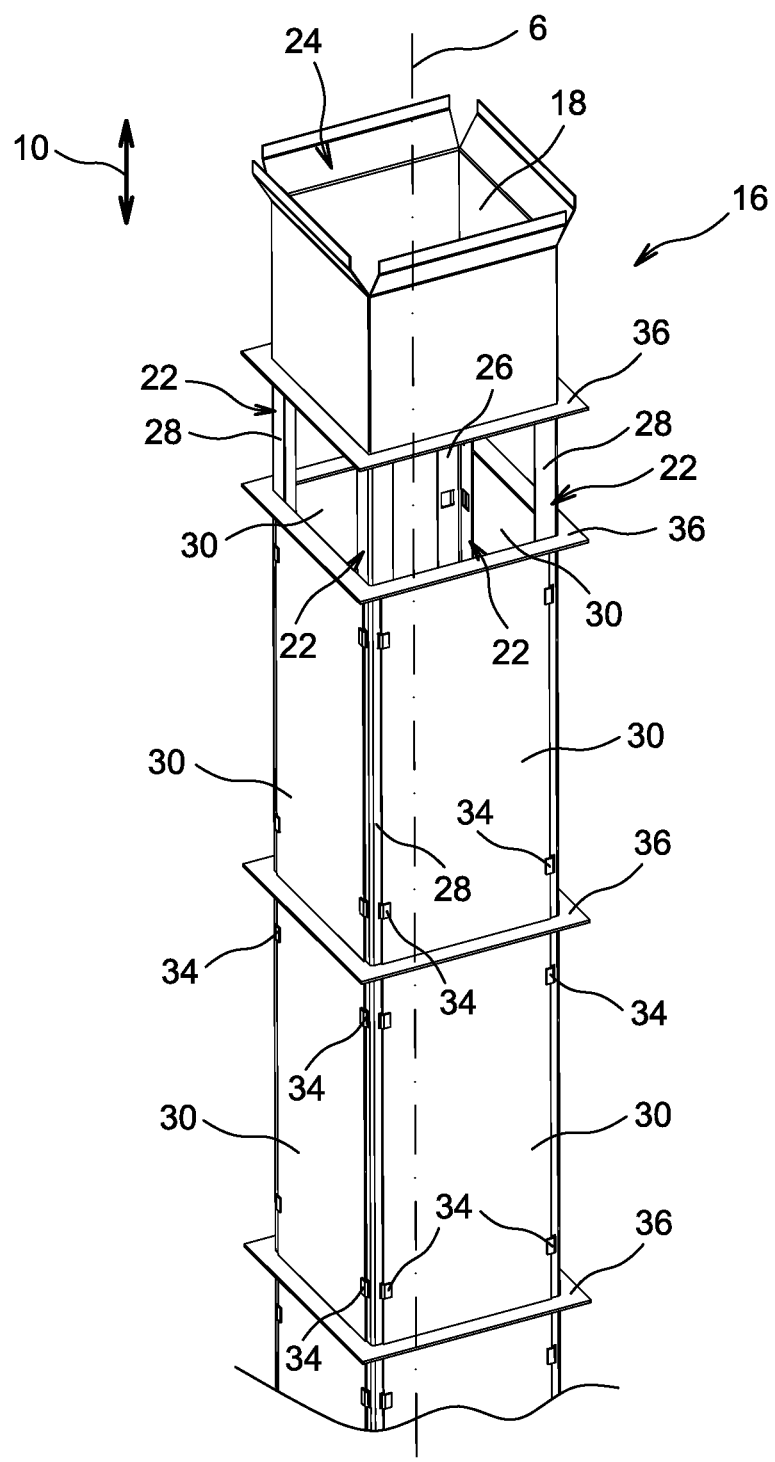
FIG. 2 shows a partial perspective view of a sleeve equipping the rack shown in FIG. 1.
Figure 3:
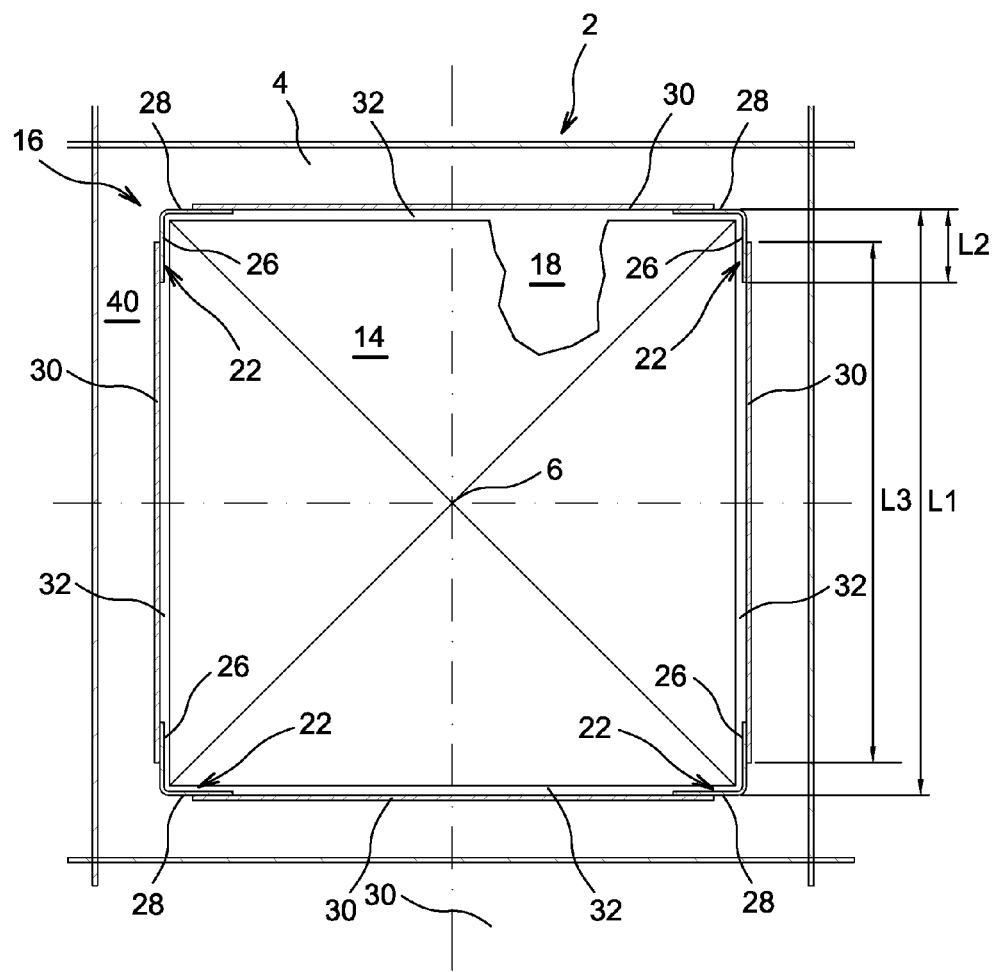
FIG. 3 shows a transverse cross-sectional view of the sleeve shown in FIG. 2, along a transverse plane passing at a distance from the maintenance tabs of the neutron-absorbing plates, and at a distance from the maintenance means of the profiles each forming a corner.

First, it is indicated that the sleeve 16 preferably has, in transverse cross-section, a general square shape, as shown in FIG. 3. As a result, this transverse section has four attached sides corresponding to the four attached faces, respectively, of the sleeve shown in FIG. 2.

The sleeve 16 has, preferably at each of the four angles of the generally square-shaped section, a profile 22 forming a corner. These four profiles, arranged parallel to the longitudinal direction 10, each preferably extend over the entire length of the sleeve. Nevertheless, as shown in FIG. 2, an assembly forming a funnel 24 integral with the sleeve 16 can be placed protruding on the upper end of the profiles 22, so as to facilitate centering of the fuel assembly, when it is loaded in the cavity 18. This funnel 24 then has a widened upper end forming the top end of the cavity 18, and intended to be in contact with the side surface 12 of the associated cell 4.

The profiles 22, made of stainless steel, each have a section with two arms in the shape of an L, both arms preferably being the same length.

Each profile 22 has an inner surface 26 defining the cavity 18, said L-shaped surface corresponding to that oriented towards the inside of the sleeve. Moreover, each profile 22 has an outer surface 28 opposite the inner surface 26, said L-shaped surface being oriented towards the adjacent cells.

The outer surfaces 28 are provided to support plates made from a neutron-absorbing material, as will now be described. Indeed, each side of the generally square-shaped section is made using a neutron-absorbing plate 30, preferably made from a metallic-matrix composite material comprising boron, but alternatively able to made from any other neutron-absorbing material, such as borated aluminum or borated stainless steel.

As mentioned above, the plates 30 are kept bearing on the outer surface 28 of the profiles 22, preferably in direct contact with said surfaces 28. Thus, the guiding of the fuel assembly, when it is loaded and unloaded, is done carefully with only the profiles 22 forming each corner, and more specifically with the inner surface 26 thereof. However, the inner surface of the plates 30 therefore stays not in contact with the assembly 14 during these operations as well as during storage, as diagrammed in FIG. 3 with the empty spaces 32 between the inner surface of the plates 30 and the side wall of the assembly 14. As a result, the risk of damage by rifling of the plates 30 during loading and unloading of the assembly is advantageously brought to naught.

FIG. 3 references the width L1 of one side of the section, each side therefore being made from a first arm of one of the profiles 22, a plate 30, and a second arm belonging to the directly consecutive profile 22, situated in the same plane as said first arm, with the understanding that the plate 30 is kept bearing against each of the first and second arms. This width L1 of the side of the section must obviously also be considered the width of the face of the sleeve to which that side corresponds. The width of the arm L2 has also been referenced, said width preferably being identical for both of the aforementioned arms. Lastly, the width L3 of the plate 30 has been referenced.

Preferably, the dimensions are chosen so as to satisfy the following relationships:

(i): $0.1 < L2/L1 < 0.4$; and still more preferably (i'): $0.05 < L2/L1 < 0.25$; and (ii) $0.75 < L3/L1 < 1$ Relationships (i) and (i'), which preferably apply to each of the sides of the section, amount to a substantial spacing between the directly consecutive profiles 22, whereas relationship (ii) shows the non-necessity of providing the neutron-absorbent plates over the entire width of the faces of the sleeve, having also specified that each plate 30 is preferably centered on its associated side.

As shown in FIG. 2, it is preferably provided that a same face of the sleeve is made with several plates 30 adjacent along the longitudinal direction 10, and preferably spaced apart from each other, as will be described in detail later. This so-called cut configuration along the longitudinal direction makes it possible to place neutron-absorbing plates only in the locations of the sleeve where neutron absorption is necessary, and not necessarily continuously over the entire length of the sleeve. For example, in FIG. 2, the upper portion of the faces of the sleeve does not have such plates, and the same can also be true for the lower portion of the faces, as well as potentially any other portion of these same faces.

Figure 4:
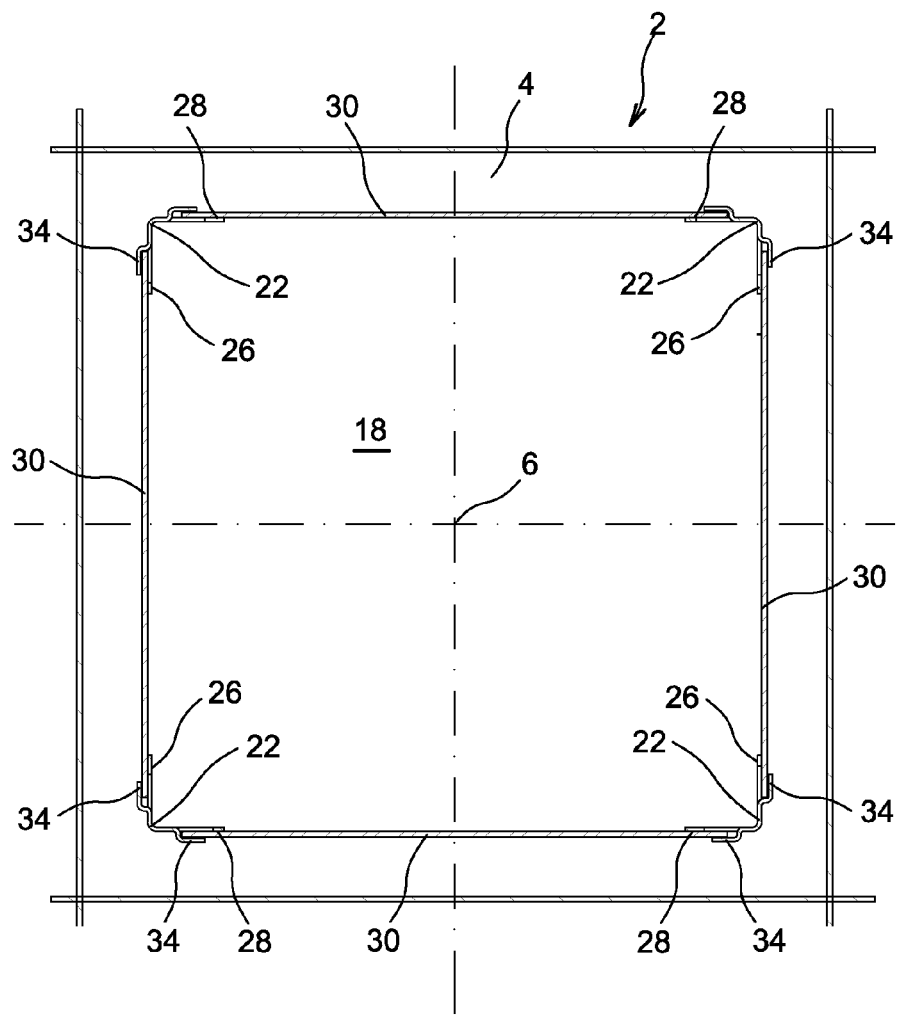
FIG. 4 shows another transverse cross-sectional view of the sleeve shown in FIG. 2, along a transverse plane passing through maintenance tabs of the neutron-absorbing plates.

As shown in FIGS. 2 and 4, each plate 30 is mounted on two directly consecutive profiles 22, preferably using maintenance tabs 34 obtained by piercing said profiles, or fixedly attached thereon, for example by welding. Each tab 34 then defines, together with the outer surface 28 of the concerned profile 22, a notch in which a longitudinal edge of the plate to be maintained is housed. Thus, during assembly, the plates can be assembled by sliding between the outer surfaces of said profiles and the tabs, the sliding preferably being done in the longitudinal direction. These tabs 34, cooperating with the two opposite longitudinal edges of the concerned plate 30, not only allow pressing of the plate against the profiles 22, but also form a translational stop in the direction of the width of the plate, i.e. in the direction orthogonal to the longitudinal direction 10 in the plane of said plate 30, in both directions.

Moreover, it is possible to tighten the tabs 34 to obtain high-intensity gripping of the plate 30 between said tabs 34 and the outer surface 28 of the profiles, thus also ensuring locking of said plate in the longitudinal direction 10.

Nevertheless, to lock the plates 30 in the latter direction, with regard to the profiles 22, a solution is preferably chosen of making said plates abut against a means for maintaining the profiles relative to each other. These maintenance means will now be described, more specifically in reference to FIGS. 2 and 5.

They each assume the form of a maintenance structure 36 arranged in a plane substantially orthogonal to the longitudinal direction 10, and surrounding the profiles 22 they contact. They are therefore spaced apart from each other along the latter direction.

The rigid mechanical connection between these structures 36 and the profiles 22 is preferably ensured by welding. This makes it possible to position the profiles extremely precisely relative to each other, thereby ensuring a completely controlled geometry of the cavity 18.

Figure 5:
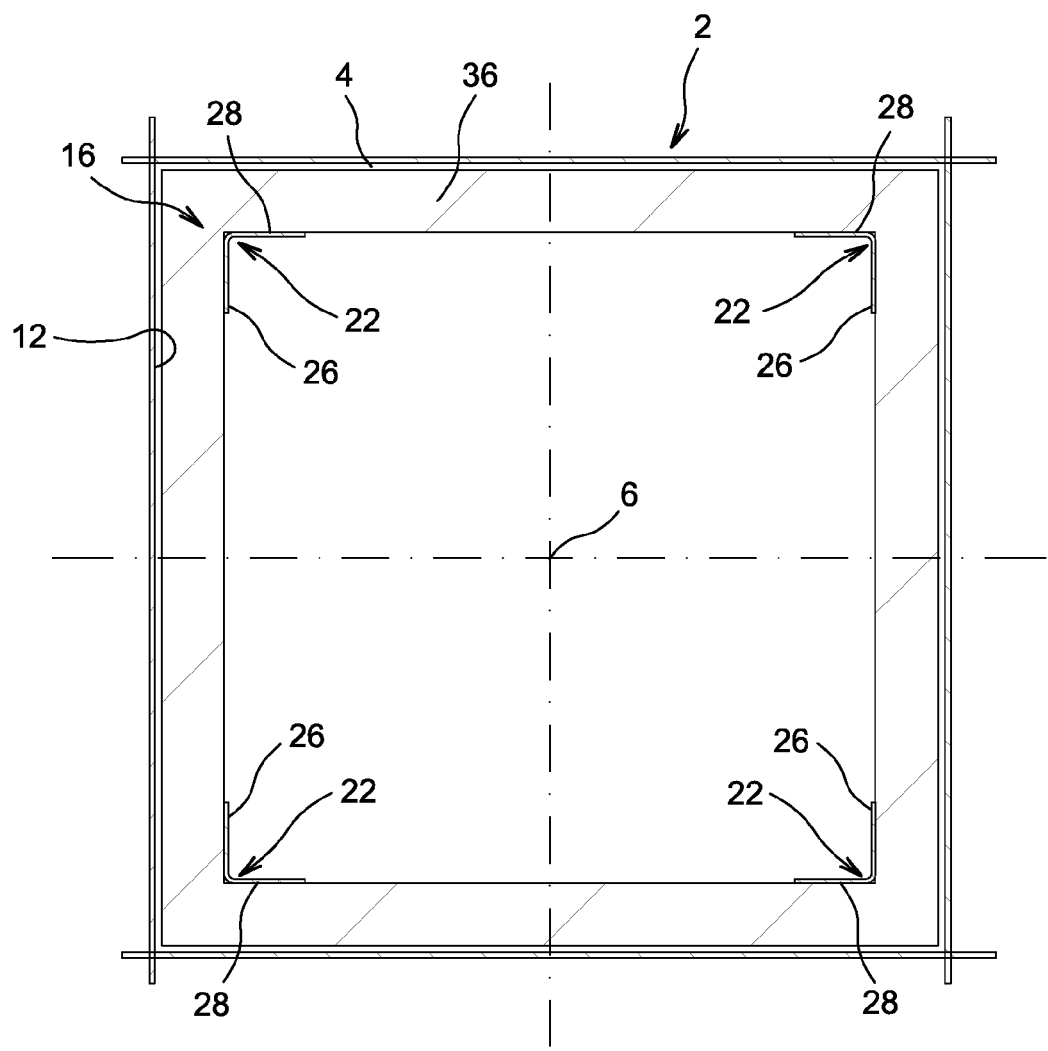
FIG. 5 shows another transverse cross-sectional view of the sleeve shown in FIG. 2, along a transverse plane passing through maintenance means of the profiles.

As shown in FIGS. 2 and 5, the structures 36, preferably made from stainless steel, each have a general shape substantially identical to the shape of the transverse section of the sleeve, i.e. a general square shape. As a result, each structure 36 can be likened to a frame whereof the angles house, inwardly, the profiles 22 that have a substantially complementary shape, a direct contact being provided between the outer surface 28 of the profiles 22 and the inside of the frames, at the angles of the latter parts. Preferably, the frames are fixed on the profiles by welding.

In the preferred embodiment where the faces of the sleeve are cut, each plate 30 of a same face extends between two frames 36 that are directly consecutive in the longitudinal direction 10, these two frames then each forming a stop for the plate in that same direction or in both directions, respectively. To do this, each plate 30 then has a length substantially equal to the distance separating the two frames 36 between which it is located.

The frames 36, in contact with the upper and lower edges of the plates 30, are also provided to ensure centering of the sleeve 16 in its cell 4, only an assembly play being retained between the periphery of the frames 36 and the side surface 12 defining the cell 4. The frames then form cross-pieces that form a water blade all around the sleeve, in the spaces referenced 40 in FIG. 3, delimited in the longitudinal direction by two directly consecutive frames 36, and laterally by the faces of the sleeve and the lateral surface 12 defining the cell 4 housing said sleeve.

Lastly, it should be noted that the frames 36 surround the profiles 22, but not the plates 30.

As an example for information, the production of such a sleeve 16, intended to then be introduced into its associated cell 4, can consist of production by "stage," consisting of the placement of a first frame 36 around pre-positioned profiles, the fastening of said first frame on the profiles, the assembly by sliding, in the notches defined by the tabs 34, of four plates 30 laterally closing the concerned stage of the sleeve, then the placement of a second frame 36 around the profiles, above the aforementioned plates, and so on.

Figure 6:
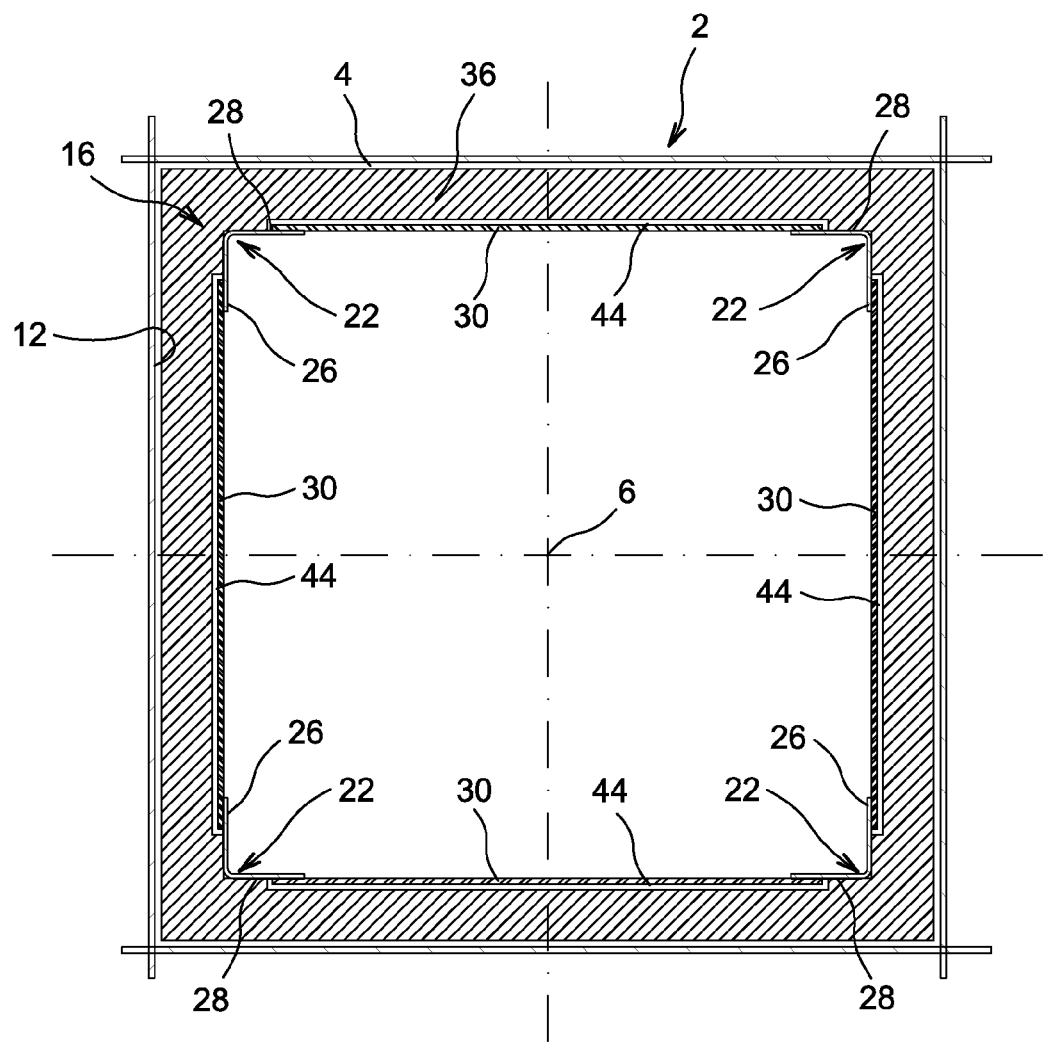
FIG. 6 shows a view similar to that of FIG. 5, with the storage rack assuming the form of a still more preferred embodiment of the present invention.
Figure 7:
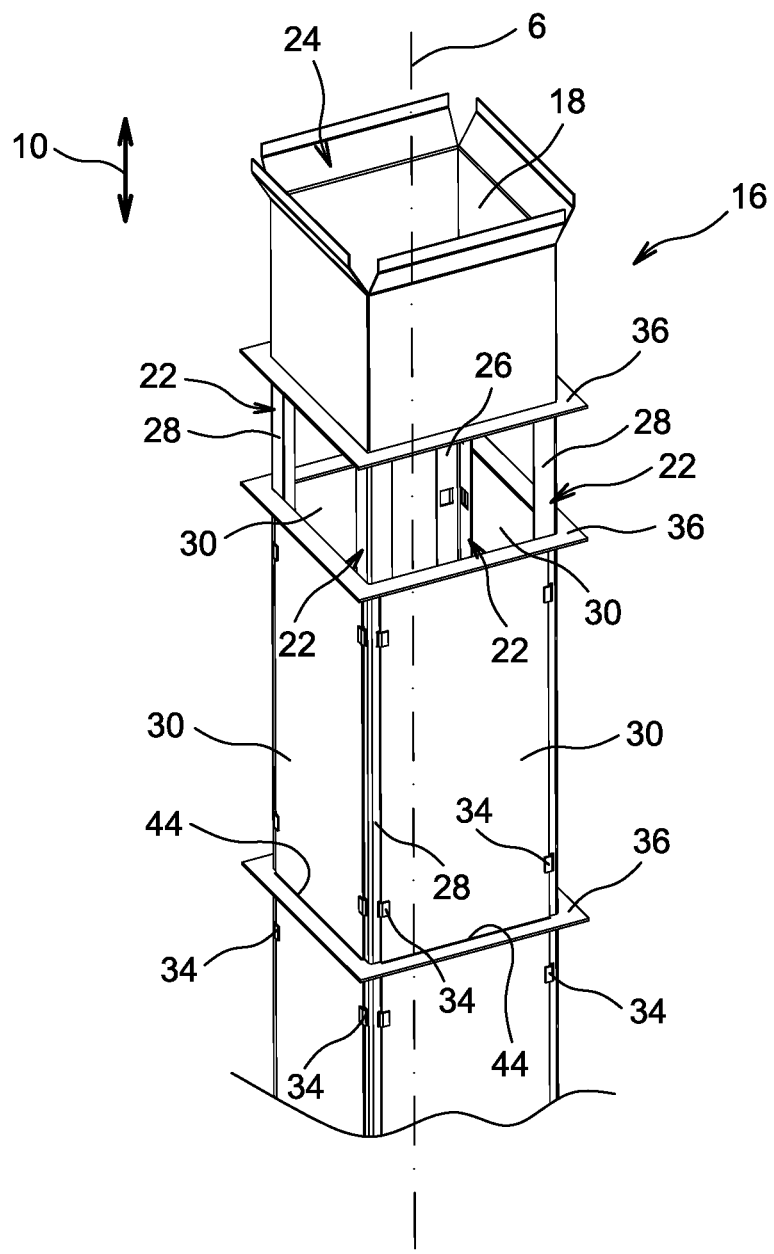
FIG. 7 shows a perspective view of the sleeve shown in FIG. 6.

According to a still more preferred embodiment illustrated in FIGS. 6 and 7, a single plate 30 is provided on each of the faces of the sleeve, the length of the plate being substantially equal to that of the active portion of the assembly. Thus, for the passage through the structures 36 also in contact with the outer surface 28 of the profiles 22, these structures are equipped, at their inner edge, with recesses 44. There are therefore four recesses 44 respectively provided on each of the four sides of the structures 36, each of said recesses 44 therefore housing a plate extending on either side of the concerned structure 36, in the longitudinal direction.

This configuration is obtained by sliding the plates 30 through the recesses 44 between the profiles 22 and the maintenance structures 36, then by fastening them on the outer surface of the profiles 22. Thus, the depth of the recesses 44 makes it possible to obtain play between the plates 30 and the maintenance structures 36 such that the water and the air bubbles can easily pass on either side of these structures 36. Having a single plate 30 on each of the faces of the sleeve makes it possible to reinforce the neutron efficiency by eliminating any longitudinal discontinuity between the neutron-absorbing plates.

The other features of the rack remain unchanged relative to that described in reference to FIGS. 1 to 5.

Of course, various modifications can be made by those skilled in the art to the invention just described, purely by way of non-limiting examples.

The invention claimed is:

1. A storage rack for nuclear fuel assemblies, comprising a rigid structure defining a plurality of adjacent cells extending parallel to a longitudinal direction of the rack, said rack also comprising, in at least one of said cells, a sleeve defining a cavity extending parallel to said longitudinal direction, and intended to receive a nuclear fuel assembly, said sleeve having, in cross-section orthogonal to said longitudinal direction, a generally polygonal shape whereof at least some of the sides comprise plates made from a neutron-absorbing material, characterized in that said sleeve also includes:

profiles each forming a corner piece, spaced apart from each other and extending parallel to said longitudinal direction and arranged on at least several angles of said generally polygonal section, said profiles serving as a mounting bracket for said neutron-absorbing plates and having an inner surface defining said cavity making it possible to guide a nuclear fuel assembly when it is loaded in said cavity, as well as an outer surface opposite said inner surface and said outer surface on which said neutron-absorbing plates bear; and a maintenance means for maintaining said profiles relative to each other, said maintenance means ensuring centering of the sleeve in the cell of the rack and comprising a plurality of maintenance structures surrounding said profiles and spaced apart from each other in the longitudinal direction, wherein said maintenance structures are fixed bearing on the outer surface of said profiles.

2. The rack according to claim 1, characterized in that at least one of said plates extends on either side of at least one of said maintenance structures in the longitudinal direction, passing in a recess formed in said structure.

3. The rack according to claim 2, characterized in that each plate has a length substantially identical to the length of the profiles, in the longitudinal direction.

4. The rack according to claim 1, characterized in that each face of said sleeve has a plurality of plates made from a neutron-absorbing material, adjacent in the longitudinal direction.

5. The rack according to claim 4, characterized in that each plate extends between two maintenance structures that are directly consecutive in the longitudinal direction, these structures forming a stop for said plate in that same direction.

6. The rack according to claim 1, characterized in that each maintenance structure is arranged in a plane substantially orthogonal to said longitudinal direction.

7. The rack according to claim 1, characterized in that each profile assumes, in cross-section orthogonal to the longitudinal direction, an L or V shape.

8. The rack according to claim 1, characterized in that each plate is made from a metallic matrix composite material comprising boron carbide.

9. The rack according to claim 1, characterized in that each plate is mounted on two directly consecutive profiles, using maintenance tabs provided on said profiles.

10. The rack according to claim 1, characterized in that the width (L3) of each plate is strictly smaller than the width (L1) of the face of the sleeve it partially forms.

\* \* \* \* \*